(12) United States Patent
Zechlin

(10) Patent No.: US 7,010,312 B1
(45) Date of Patent: Mar. 7, 2006

(54) COMMUNICATIONS METHOD AND SYSTEM TO CONVERT MESSAGES INTO TELEVISION SIGNALS

(75) Inventor: Oliver Zechlin, Stein (DE)

(73) Assignee: Siemens Aktiengellschaft, Munich (DE)

( * ) Notice: Subject to any disclaimer, the term of this patent is extended or adjusted under 35 U.S.C. 154(b) by 0 days.

(21) Appl. No.: 10/018,844

(22) PCT Filed: Apr. 11, 2000

(86) PCT No.: PCT/DE00/01111

§ 371 (c)(1),
(2), (4) Date: Apr. 22, 2002

(87) PCT Pub. No.: WO01/01684

PCT Pub. Date: Jan. 4, 2001

(30) Foreign Application Priority Data

Jun. 24, 1999 (DE) ................................ 199 29 001

(51) Int. Cl.
*H04Q 7/20* (2006.01)
(52) U.S. Cl. ............ 455/466; 455/466; 455/31.3; 455/450; 379/88; 379/110; 348/14.2; 348/14.4; 725/62
(58) Field of Classification Search ............ 455/466, 455/403, 422.1, 412.1, 414, 517, 31.3, 450; 370/465, 466, 467, 469, 496; 348/461, 468, 348/14.2–14.4; 379/88–110; 725/62
See application file for complete search history.

(56) References Cited

U.S. PATENT DOCUMENTS

| 5,706,334 | A | * | 1/1998 | Balk et al. ................ 379/88.13 |
| 5,818,935 | A |   | 10/1998 | Maa |
| 6,216,008 | B1 | * | 4/2001 | Lee ............................ 455/466 |
| 6,400,958 | B1 | * | 6/2002 | Isomursu et al. ........... 455/466 |
| 6,556,248 | B1 |   | 4/2003 | Kim |

FOREIGN PATENT DOCUMENTS

| EP | 0723369 A1 | 7/1996 |
| EP | 0 880 293 A1 | 11/1998 |
| EP | 0880252 A1 | 11/1998 |
| EP | 880293 A1 * | 11/1998 |
| EP | 0914741 B1 | 10/2001 |
| WO | WO 98/28920 | 7/1998 |
| WO | WO 99/63729 | 12/1999 |
| WO | WO 00/27115 | 5/2000 |

* cited by examiner

*Primary Examiner*—Temica Beamer
*Assistant Examiner*—Julio Perez
(74) *Attorney, Agent, or Firm*—Morrison & Foerster LLP

(57) ABSTRACT

Short messages are sent by mobile terminals of a mobile radiotelephone system to a TV transmitter unit identified by a corresponding telephone number. The short messages are converted into TV transmission signals in said unit and fed to the television network so that the short messages can be shown on TV sets connected to the television network.

17 Claims, 2 Drawing Sheets

COMMUNICATIONS METHOD AND SYSTEM TO CONVERT MESSAGES INTO TELEVISION SIGNALS

CLAIM FOR PRIORITY

This application claims priority to International Application No. PCT/DE00/01111 which was published in the German language on Jan. 4, 2001.

TECHNICAL FIELD OF THE INVENTION

A system and method of communication, and in particular, for communicating short messages into television signals.

BACKGROUND OF THE INVENTION

In conventional mobile radiotelephone systems, communications information, in particular voice information, is transmitted between mobile terminals or mobile telephones. To transmit the information, base stations are provided which forward the information arriving from a mobile telephone to the required destination terminal. The base stations also serve as an interface with the fixed telephone network to which line-connected subscriber terminals are connected, and with which communication with the mobile telephones is similarly possible.

In modern mobile radiotelephone systems, e.g. GSM mobile radiotelephone systems (Global System For Mobile Communications), "Teleservices" are additionally offered. A teleservice for example in GSM mobile radiotelephone systems, is the "Short Message Services" (SMS), which supports the transmission of short messages comprising up to 160 (7-bit ASCII) alphanumeric characters, between the mobile telephones of the mobile radiotelephone system. Each short message is transmitted in the form of a data packet. A short message of this type is entered via the keypad of one mobile telephone and is presented on the display of the mobile telephone dialed up by the transmitting mobile radiotelephone subscriber.

However, in these short message services which are offered in conventional mobile radiotelephone systems, short messages can normally be sent to one destination subscriber only. If a user wants to address a plurality of destination subscribers, the short message transmission must be repeated for telephone numbers allocated to the destination being addressed. In addition, short messages can only be transmitted between persons who possess a mobile telephone or other mobile terminal which is capable of receiving short information of this type.

SUMMARY OF THE INVENTION

In one embodiment of the invention, there is a communications method. The method includes, for example, inputting short message information on a mobile terminal, transmitting short message information from the mobile terminal via a mobile radiotelephone channel to a corresponding base station, transmitting the short message information from the base station to a TV transmitter unit, converting the short message information into corresponding TV transmission signals, transmitting the TV transmission signals corresponding to the short message information to a TV set, and presenting short message information on the TV set to visualize the TV transmission signals or transmitting to another mobile terminal for output.

In another aspect of the invention, during inputting, a telephone number is entered together with the short message information, and during the transmitting from the base station, the short message information is transmitted to the TV transmitter unit corresponding to the telephone number.

In another aspect of the invention, during transmitting the TV transmission signals, the TV transmission signals corresponding to the short message information are transmitted via a transmission channel reserved for the transmission of short message information to the TV set.

In yet another aspect of the invention, the TV transmission signals corresponding to the short message information are transmitted via a transmission channel reserved for a TV program to the TV set.

In another aspect of the invention, during presenting, the short message information is presented in videotext of the corresponding TV program.

In another aspect of the invention, during presenting, the short message information is inserted into the TV program.

In still another aspect of the invention, during presenting, the short message information is presented on the TV set in the form of a permanent local display.

In another aspect of the invention, during presenting, the short message information is presented on the TV set in the form of a scrolling display.

In another aspect of the invention, during presenting, short message information from different mobile terminals is presented simultaneously on the TV set.

In yet another aspect of the invention, the short message information during presenting is presented on the TV set together with a telephone number which is allocated to the mobile terminal and is used during inputting and transmitting from the mobile terminal to enter and send the short message information.

In another aspect of the invention, the short message information during inputting is entered via a keypad of the mobile terminal.

In another embodiment of the invention, there is a communications system. The system includes, for example, a plurality of mobile terminals which communicate with one another via a mobile radiotelephone channel, whereby the mobile terminals are configured to transmit short message information, at least one TV transmitter unit having a reception unit to receive the short message information transferred by one of the mobile terminals, a conversion unit to convert the received short message information into TV transmission signals, and a transmission unit to transmit the TV transmission signals corresponding to the received short message information via a TV transmission channel, wherein the mobile terminals communicate with one another via at least one base station, the base station configured such that it forwards short message information received from one of the mobile terminals to the TV transmitter unit identified by a corresponding telephone number or transmits the short message information directly to another mobile terminal for output.

In another aspect of the invention, the transmission unit of the TV transmitter unit is configured to transmit the TV transmission signals corresponding to the short message information via the TV transmission channel reserved for the transmission of short message information.

In another aspect of the invention, the transmission unit of the TV transmitter unit are configured to transmit the TV transmission signals corresponding to the short message information via the TV transmission channel reserved for the transmission of short message information.

In still another aspect of the invention, the transmission unit of the TV transmitter unit is configured to transmit the short message information via a TV transmission channel embedded in videotext information of the corresponding TV program.

In another aspect of the invention, the short message information is transmitted via the TV transmission channel to a plurality of TV sets, the TV sets presenting the short message information in the form of a permanent local display.

In another aspect of the invention, the short message information is transmitted via the TV transmission channel to a plurality of TV sets, the TV sets presenting the short message information in the form of a scrolling display.

BRIEF DESCRIPTION OF THE DRAWINGS

The invention is explained in detail below with reference to the attached drawing.

DETAILED DESCRIPTION OF THE PREFERRED EMBODIMENTS

The present invention discloses a communications method and system which enables the transmission of short messages to an unlimited group of persons.

According to the invention, packet-oriented messages, such as SMS short messages or data transmitted by means of GPRS (GSM General Packet Radio Services), are transmitted from mobile terminals, e.g. mobile telephones, of a mobile radiotelephone system to a TV transmitter unit. These messages are converted into TV transmission signals and fed into the TV network, so that the messages can be visualized and presented on the screens of TV sets connected to the TV network.

The short messages can be presented, for example, continuously on a free channel space, or can be incorporated into the videotext of a corresponding TV program.

In this way, subscribers can participate spontaneously and interactively in television productions or television programs. In this respect, it has only been known to interact with the television program via a telephone voice link, via DTMF-enabled telephones (Dual Tone Multi-Frequency) or via cable-connected data transmission (in particular via the Internet), which requires the appropriate hardware and is often expensive.

The present invention also provides the ability to create virtual TV chatrooms for discussion between multiple subscribers, or TV marketplaces for submitting sale/purchase advertisements, etc.

With the present invention, mobile radio subscribers can address an unlimited group of persons, since the TV transmitter unit selected by the subscriber forwards the relevant short messages to all TV sets connected to the television network. In particular, subscribers who possess no mobile terminal can also be addressed. The subscriber need only possess a TV set and a mobile telephone in order to participate actively in the communication.

Figure 1:
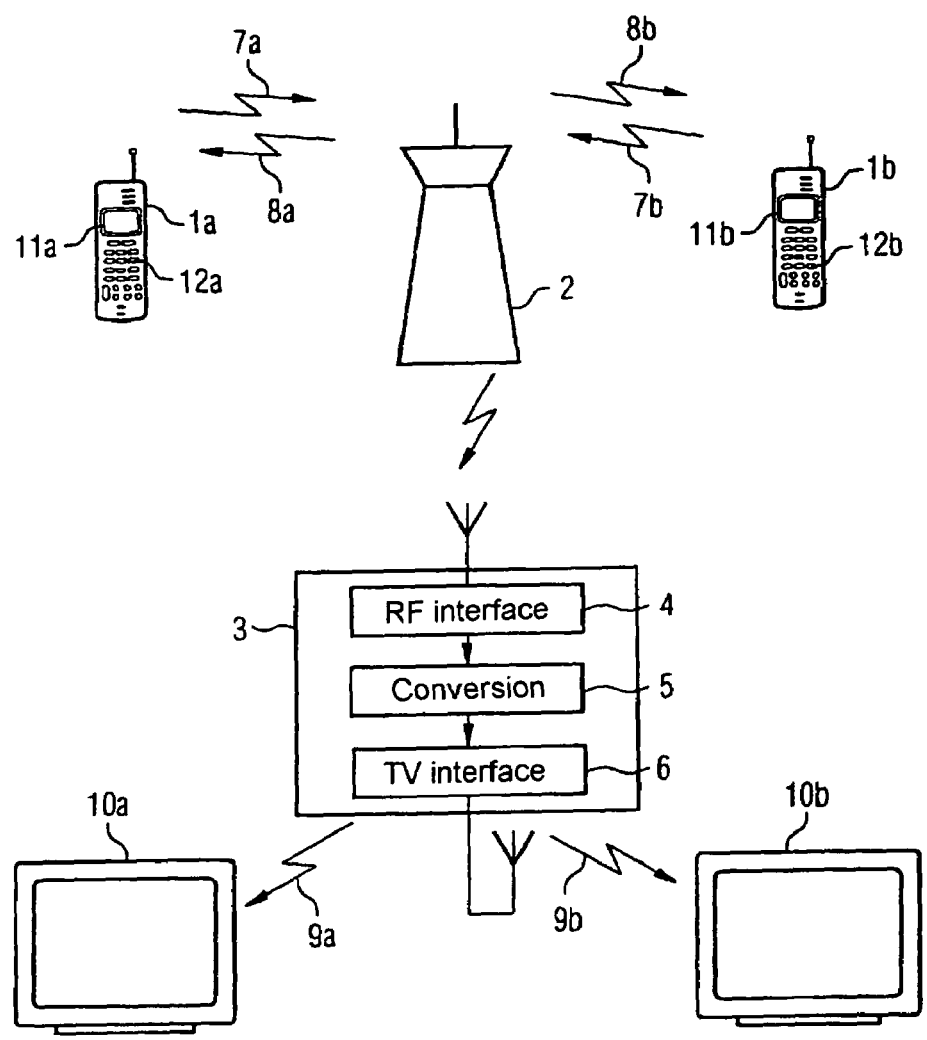
FIG. 1 shows a simplified structure of a communications system according to an embodiment of the present invention.

The communications system shown in FIG. 1 comprises a mobile radiotelephone system, for example a mobile radiotelephone system according to the GSM standard, including two mobile telephones $1a$, $1b$ and a base station 2. The mobile telephones $1a$, $1b$ transmit communications information via an uplink $7a$, $7b$ to the base station 2, which in turn transmits communications information via the downlink $8a$, $8b$ to the mobile telephones $1a$, $1b$. The base station 2 serves as an interface between mobile telephones of the corresponding mobile radiotelephone system, and between the mobile radiotelephone system and a fixed telephone network (not shown). This makes it possible to telephone or communicate via the mobile telephones $1a$, $1b$ with fixed-network subscribers. The mobile radiotelephone network typically has a cellular structure, whereby a base station 2 is allocated to each radio cell and is responsible for the mobile telephones $1a$, $1b$ located in the corresponding radio cell.

Packet-oriented messages, i.e. information transmitted in the form of data packets, can be transmitted by the mobile telephones $1a$, $1b$. These packet-oriented messages may, for example, be SMS (Short Message Services) short messages or data transmitted by means of GPRS (GSM General Packet Radio Services). These short messages may be entered via the keypad $12a$, $12b$ of the mobile telephone or by means of voice input (through voice recognition on the mobile telephone itself or via a voice server of the mobile radiotelephone network) and are transmitted via a mobile radiotelephone channel to the required mobile radiotelephone subscriber identified via a corresponding telephone number, to be presented there on the display $11a$, $11b$.

In addition, a television or TV system is provided which comprises a TV transmitter unit 3 with a terrestrial or cable-connected television network connected thereto. By dialing a telephone number, which is allocated to a specific television program or the corresponding TV transmitter unit 3, any mobile radiotelephone subscriber can transmit short messages, not only to one other mobile radiotelephone subscriber, but also to TV sets $10a$, $10b$ connected to the television network of the dialed-up TV transmitter unit 3.

The TV transmitter unit 3 has a radio-frequency interface 4 via which short information can be received from a mobile radiotelephone subscriber $1a$, $1b$, and can be demodulated and decoded. A unit 5 for processing the received short messages and for converting the short messages into a television-compatible format is connected to the radio-frequency interface 4. The information processed in this way is then fed via a TV interface 6 into the television network and transmitted in the form of TV signals via TV signal paths $9a$, $9b$ in a cableless or cable-connected manner to the TV sets $10a$, $10b$ connected to the television network.

The TV transmitter unit 3 does not have to be a complete TV transmitter station, but rather the function of the TV transmitter unit 3 can also be implemented merely by means of a correspondingly designed server, which can be dialed up via a corresponding telephone number from any mobile telephone $1a$, $1b$ and can feed the converted, received short messages into the television network.

The short messages transmitted to the TV sets $10a$, $10b$ can be visualized in different ways on the corresponding screens. Thus, for example, it is possible for the short information to be transmitted by the TV transmitter unit 2 via a TV transmission channel to the TV sets $10a$, $10b$, whereby a dedicated channel space is provided to display the currently available short information. The short information can also be incorporated in the TV sets $10a$, $10b$ into the videotext service offered by the various TV programs or TV transmitters. It is also possible for the short information to be transmitted to the TV sets 10a, 10b together with the TV transmission signals allocated to a specific TV program or TV transmitter and for the short information then to be inserted into the normal TV program. The short messages can be presented on the screens of the TV sets 10a, 10b connected to the television network either continuously or in the form of a permanent local display on the corresponding screen.

Additional information, such as the name and/or telephone number of the mobile radiotelephone subscriber sending the short messages, can also be added by the TV transmission station 2 to the short messages.

With the aid of the communications system according to the invention shown in FIG. 1, it is, for example, possible for any mobile radiotelephone subscriber to intervene interactively and spontaneously in a current television program and send messages to the television audience.

It is thus also possible to create virtual TV market places, where mobile radiotelephone subscribers can submit sale or purchase advertisements. In addition, a virtual TV chat room, for example, can also be created, which will be explained in detail below with reference to the illustrations shown in FIGS. 2A, 2B and 3.

Figure 2A:
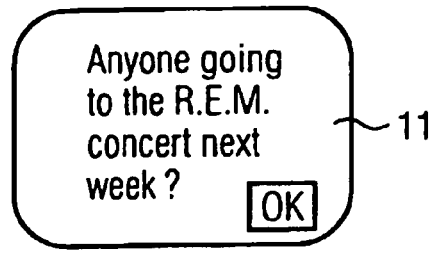
FIGS. 2A and 2B show an exemplary input and transmission of short messages in the communications system shown in FIG. 1.
Figure 2B:

As shown in FIG. 2A, with reference to the content of the display 11 of a mobile telephone, a mobile radiotelephone subscriber initially enters the short message "Anyone going to the R.E.M. concert next week?" via the keypad of his mobile telephone and transmits this by entering the telephone number "0179 700 800 9", which is allocated to the "MSNBC-Chat TV" application, via the mobile radiotelephone network to a base station 2 (cf. the illustration shown in FIG. 2B). The base station 2 then forwards the short message to a TV transmitter unit 3 corresponding to the dial-up application.

Figure 3:
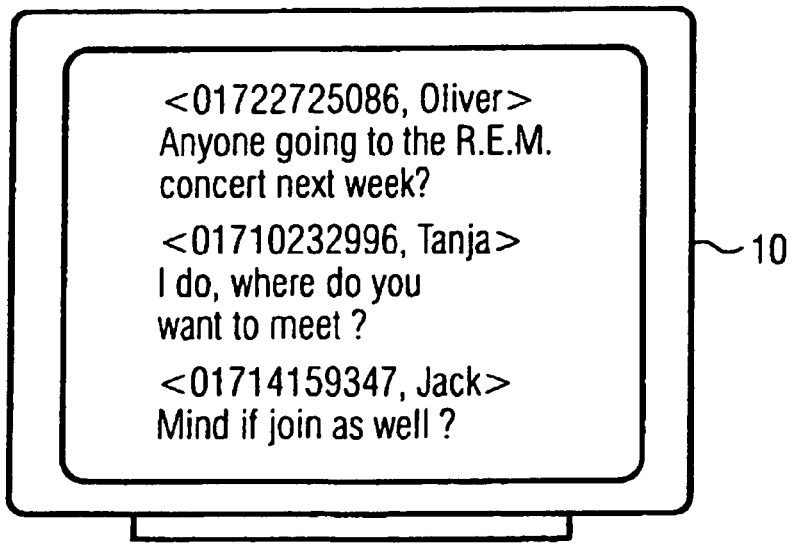
FIG. 3 shows a visualization of short messages transmitted via the communications system shown in FIG. 1 on the screen of a TV set.

In the TV transmitter unit 3, the short message is converted into a TV transmission signal, is fed into the corresponding television network and transmitted to the TV sets connected thereto. As shown in FIG. 3, with reference to the screen content of a corresponding TV set 10, short messages transmitted to the TV set 10 of mobile radiotelephone subscribers are presented in the form of a display scrolling from top to bottom, for example in a free channel space, thereby producing a presentation of messages similar to an Internet chat.

In the example shown in FIG. 3, the name and telephone number of the mobile radiotelephone subscriber in each case sending the short messages are presented along with the actual short messages.

What is claimed is:

1. A communications method, comprising:
   inputting short message information on a mobile terminal;
   transmitting short message information from the mobile terminal via a mobile radiotelephone channel to a corresponding base station;
   starting from the base station, optionally either further processing the short message information by transmitting the short message information from the base station to a TV transmitter unit;
   converting the short message information into corresponding TV transmission signals;
   transmitting the TV transmission signals corresponding to the short message information to a TV set; and
   visualizing the TV transmission signals to present the short message information on the TV set; or
   transmitting the short message directly to a further mobile terminal for output.

2. The communications method as claimed in claim 1, wherein during inputting, a telephone number is entered together with the short message information, and during the transmitting from the base station, the short message information is transmitted to the TV transmitter unit corresponding to the telephone number.

3. The communications method as claimed in claim 1, wherein during transmitting the TV transmission signals, the TV transmission signals corresponding to the short message information are transmitted via a transmission channel reserved for the transmission of short message information to the TV set.

4. The communications method as claimed in claim 1, wherein the TV transmission signals corresponding to the short message information are transmitted via a transmission channel reserved for a TV program to the TV set.

5. The communications method as claimed in claim 4, wherein during presenting, the short message information is presented in videotext of the corresponding TV program.

6. A communications method, comprising:
   inputting short message information on a mobile terminal;
   transmitting short message information from the mobile terminal via a mobile radiotelephone channel to a corresponding base station;
   starting from the base station, optionally either further processing the short message information by transmitting the short message information from the base station to a TV transmitter unit;
   converting the short message information into corresponding TV transmission signals;
   transmitting the TV transmission signals corresponding to the short message information to a TV set; and
   visualizing the TV transmission signals to present the short message information on the TV set; or
   transmitting the short message directly to a further mobile terminal for output, wherein during presenting, the short message information is inserted into the TV program.

7. The communications method as claimed in claim 1, wherein during presenting, the short message information is presented on the TV set in the form of a permanent local display.

8. A communications method, comprising:
   inputting short message information on a mobile terminal;
   transmitting short message information from the mobile terminal via a mobile radiotelephone channel to a corresponding base station;
   starting from the base station, optionally either further processing the short message information by transmitting the short message information from the base station to a TV transmitter unit;
   converting the short message information into corresponding TV transmission signals;
   transmitting the TV transmission signals corresponding to the short message information to a TV set; and
   visualizing the TV transmission signals to present the short message information on the TV set; or
   transmitting the short message directly to a further mobile terminal for output, wherein during presenting, the short message information is presented on the TV set in the form of a scrolling display.

9. A communications method, comprising:
   inputting short message information on a mobile terminal;
   transmitting short message information from the mobile terminal via a mobile radiotelephone channel to a corresponding base station;

starting from the base station, optionally either further processing the short message information by transmitting the short message information from the base station to a TV transmitter unit;

converting the short message information into corresponding TV transmission signals;

transmitting the TV transmission signals corresponding to the short message information to a TV set; and visualizing the TV transmission signals to present the short message information on the TV set; or transmitting the short message directly to a further mobile terminal for output, wherein during presenting, short message information from different mobile terminals is presented simultaneously on the TV set.

10. The communications method as claimed claim 1, wherein the short message information during presenting is presented on the TV set together with a telephone number which is allocated to the mobile terminal and is used during inputting and transmitting from the mobile terminal to enter and send the short message information.

11. The communications method as claimed in claim 1, wherein the short message information during inputting is entered via a keypad of the mobile terminal.

12. A communications system, comprising:

a plurality of mobile terminals which communicate with one another via a mobile radiotelephone channel, whereby the mobile terminals are configured to transmit short message information;

at least one TV transmitter unit having a reception unit to receive the short message information transferred by one of the mobile terminals;

a conversion unit to convert the received short message information into TV transmission signals; and a transmission unit to transmit the TV transmission signals corresponding to the received short message information via a TV transmission channel, wherein the mobile terminals communicate with one another via at least one base station, the base station configured such that it optionally either forwards short message information received from one of the mobile terminals to the TV transmitter unit identified by a corresponding telephone number, or transmits the short message information directly to another mobile terminal for output.

13. The communications system as claimed in claim 12, wherein the transmission unit of the TV transmitter unit is configured to transmit the TV transmission signals corresponding to the short message information via the TV transmission channel reserved for the transmission of short message information.

14. The communications system as claimed in claim 13, wherein the transmission unit of the TV transmitter unit are configured to transmit the TV transmission signals corresponding to the short message information via the TV transmission channel reserved for the transmission of short message information.

15. The communications system as claimed in claim 14, wherein the transmission unit of the TV transmitter unit is configured to transmit the short message information via a TV transmission channel embedded in videotext information of the corresponding TV program.

16. The communications system as claimed in claim 12, wherein the short message information is transmitted via the TV transmission channel to a plurality of TV sets, the TV sets presenting the short message information in the form of a permanent local display.

17. The communications system as claimed in claim 12, wherein the short message information is transmitted via the TV transmission channel to a plurality of TV sets, the TV sets presenting the short message information in the form of a scrolling display.

* * * * *